(12) United States Patent
Kim et al.

(10) Patent No.: US 11,217,390 B2
(45) Date of Patent: Jan. 4, 2022

(54) COMPOSITE ELECTRONIC COMPONENT

(71) Applicant: SAMSUNG ELECTRO-MECHANICS CO., LTD., Suwon-si (KR)

(72) Inventors: Ki Hong Kim, Suwon-si (KR); Jae Sun Won, Suwon-si (KR); Jae Joon Yu, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/861,470

(22) Filed: Apr. 29, 2020

(65) Prior Publication Data

US 2021/0193384 A1   Jun. 24, 2021

(30) Foreign Application Priority Data

Dec. 24, 2019   (KR) ........................ 10-2019-0174305

(51) Int. Cl.

| | |
|---|---|
| *H01G 2/16* | (2006.01) |
| *H01G 4/10* | (2006.01) |
| *H01G 4/005* | (2006.01) |
| *H01G 4/14* | (2006.01) |
| *H01G 4/12* | (2006.01) |
| *H01G 4/40* | (2006.01) |
| *H01G 4/30* | (2006.01) |
| *H01G 4/012* | (2006.01) |

(52) U.S. Cl.
CPC .............. *H01G 2/16* (2013.01); *H01G 4/005* (2013.01); *H01G 4/105* (2013.01); *H01G 4/14* (2013.01); *H01G 4/012* (2013.01); *H01G 4/12* (2013.01); *H01G 4/30* (2013.01); *H01G 4/40* (2013.01)

(58) Field of Classification Search
CPC .............. H01G 4/40; H01G 4/30; H01G 2/16
See application file for complete search history.

(56) References Cited

U.S. PATENT DOCUMENTS

| | | | | |
|---|---|---|---|---|
| 4,894,746 | A | * | 1/1990 | Mori ........................ H01G 2/14 361/275.4 |
| 2016/0118187 | A1 | * | 4/2016 | Ahn ....................... H01G 4/232 361/301.4 |

FOREIGN PATENT DOCUMENTS

| | | | | |
|---|---|---|---|---|
| JP | 59130414 | A | * | 7/1984 |
| JP | 63311716 | A | * | 12/1988 |
| JP | H06-267789 | A | | 9/1994 |
| JP | 11354368 | A | * | 12/1999 |

(Continued)

*Primary Examiner* — Eric W Thomas
(74) *Attorney, Agent, or Firm* — Morgan, Lewis & Bockius LLP (57) ABSTRACT

A composite electronic component includes a capacitor structure including a dielectric layer, and a first internal electrode and a second internal electrode alternately arranged in a first direction, with the dielectric layer interposed therebetween; a fuse structure including a fuse and a fuse body; a common electrode disposed between one surface of the capacitor structure in a second direction, crossing the first direction, and one surface of the fuse structure in the second direction, and connected to the first internal electrode and the fuse; a first external electrode disposed on the other surface of the fuse structure in the second direction, and connected to the fuse; and a second external electrode disposed on the other surface of the capacitor structure in the second direction, and connected to the second internal electrode.

20 Claims, 7 Drawing Sheets

(56) References Cited

FOREIGN PATENT DOCUMENTS

| JP | 2005-294040 A | 10/2005 |
|---|---|---|
| KR | 10-0787154 B1 | 12/2007 |

\* cited by examiner

III-III'

III-III'

COMPOSITE ELECTRONIC COMPONENT

CROSS-REFERENCE TO RELATED APPLICATION(S)

This application claims benefit of priority to Korean Patent Application No. 10-2019-0174305 filed on Dec. 24, 2019 in the Korean Intellectual Property Office, the disclosure of which is incorporated herein by reference in its entirety.

TECHNICAL FIELD

The present disclosure relates to a composite electronic component.

BACKGROUND

A multilayer ceramic capacitor (MLCC), a type of multilayer electronic component, may be a chip-type condenser mounted on a printed circuit board of various electronic products such as imaging devices including liquid crystal displays (LCDs), plasma display panels (PDPs), and the like, and computers, smartphones, mobile phones, and the like, serving to charge or discharge electricity therein or therefrom. In addition, the MLCC plays a role such as stabilization in power supply voltage, decoupling, attenuation of high frequency noise, DC-Block, etc., in an electric control unit (ECU) of a vehicle.

Recently, the number of MLCCs used in vehicles has increased due to the increase in automotive electric/electronic components used due to autonomous driving of vehicles, the introduction of eco-friendly vehicles, and the like. Since the use environment of automotive electric/electronic components is harsher than that of general electronic components, and vehicles are directly related to human life, a relatively high degree of reliability may be required for MLCCs used in automotive electric/electronic components.

In particular, MLCCs have the advantage of being capable of securing a relatively high level of capacitance per volume by stacking a relatively thin dielectric layer and internal electrodes. However, in order to secure a relatively high capacity, an external impact may have critical influence on an internal structure because internal space usage should be maximized. If a crack occurs inside an MLCC due to an external impact or the like, internal electrodes having different polarities may be shorted to cut off power to the load, and may generate an overcurrent.

In addition, since most of the MLCCs may be configured in parallel in the circuit, when a failure occurs in any one of the MLCCs configured in parallel, the circuit may be no longer be functional.

Therefore, there is demand for development of a composite electronic component capable of solving a problem that occurs when an MLCC is shorted.

SUMMARY

An aspect of the present disclosure is to provide a composite electronic component in which a fuse structure and a capacitor structure are combined to protect a circuit from an overcurrent by opening the fuse structure, when an MLCC is shorted.

However, an object of the present disclosure is not limited to the above description, and will be more readily understood in the course of describing specific embodiments of the present disclosure.

According to an aspect of the present disclosure, a composite electronic component includes a capacitor structure including a dielectric layer, and a first internal electrode and a second internal electrode alternately arranged in a first direction, with the dielectric layer interposed therebetween; a fuse structure including a fuse and a fuse body; a common electrode disposed between one surface of the capacitor structure in a second direction, crossing the first direction, and one surface of the fuse structure in the second direction, and connected to the first internal electrode and the fuse; a first external electrode disposed on the other surface of the fuse structure in the second direction, and connected to the fuse; and a second external electrode disposed on the other surface of the capacitor structure in the second direction, and connected to the second internal electrode.

According to another aspect of the present disclosure, a composite electronic component includes a capacitor structure including a dielectric layer, and a first internal electrode and a second internal electrode alternately arranged in a first direction, with the dielectric layer interposed therebetween; a fuse structure including a polymer and a plurality of conductive particles; a common electrode disposed between one surface of the capacitor structure in a second direction, crossing to the first direction, and one surface of the fuse structure in the second direction, and connected to the first internal electrode and the fuse; a first external electrode disposed on the other surface of the fuse structure in the second direction, and connected to the fuse; and a second external electrode disposed on the other surface of the capacitor structure in the second direction, and connected to the second internal electrode.

According to another aspect of the present disclosure, a composite electronic component includes a capacitor structure including dielectric layers, and first internal electrodes and second internal electrodes alternately arranged with a respective one of the dielectric layers interposed therebetween; a common electrode directly connected to the first internal electrodes; a fuse structure including a fuse and a fuse body; a first external electrode disposed on the fuse structure; and a second external electrode disposed on the capacitor structure and connected to the second internal electrodes. The fuse connects the common electrode and the first external electrode to each other.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawings, an X direction may be defined as a second direction, an L direction, or a longitudinal direction, a Y direction may be defined as a third direction, a W direction, or a width direction, and a Z direction may be defined as a first direction, a stacking direction, a T direction, or a thickness direction.

Composite Electronic Component

Figure 1:
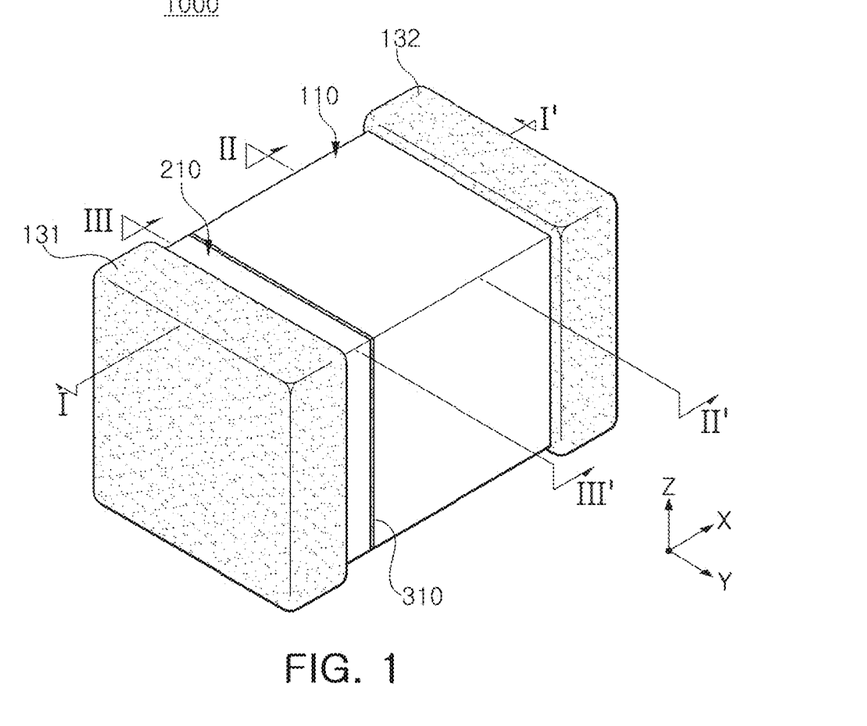
FIG. 1 is a perspective view schematically illustrating a composite electronic component according to an embodiment of the present disclosure.

FIG. 1 is a perspective view schematically illustrating a composite electronic component according to an embodiment of the present disclosure.

Figure 2:
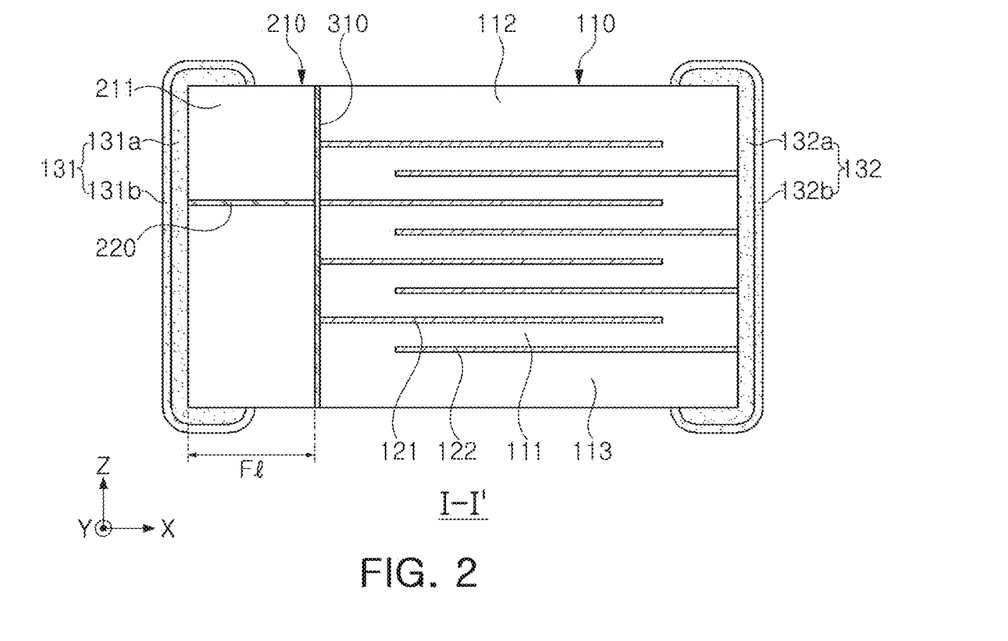
FIG. 2 is a cross-sectional view taken along line I-I' of FIG. 1.

FIG. 2 is a cross-sectional view taken along line I-I' of FIG. 1.

Figure 3:
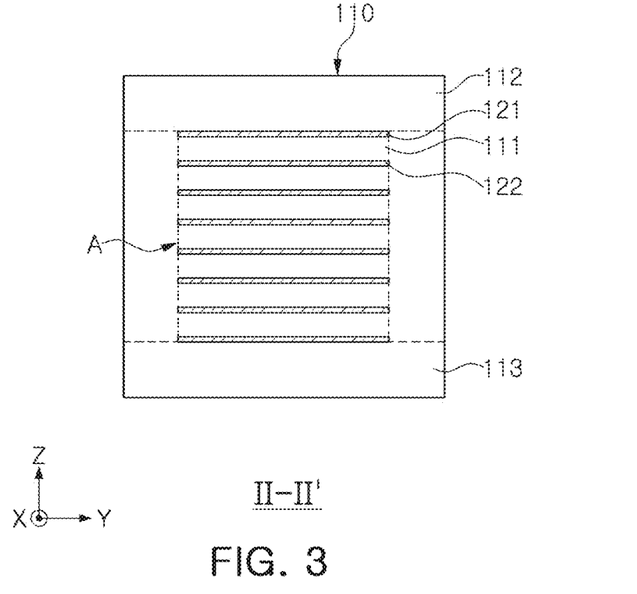
FIG. 3 is a cross-sectional view taken along line II-II' of FIG. 1.

FIG. 3 is a cross-sectional view taken along line II-II' of FIG. 1.

Figure 4:
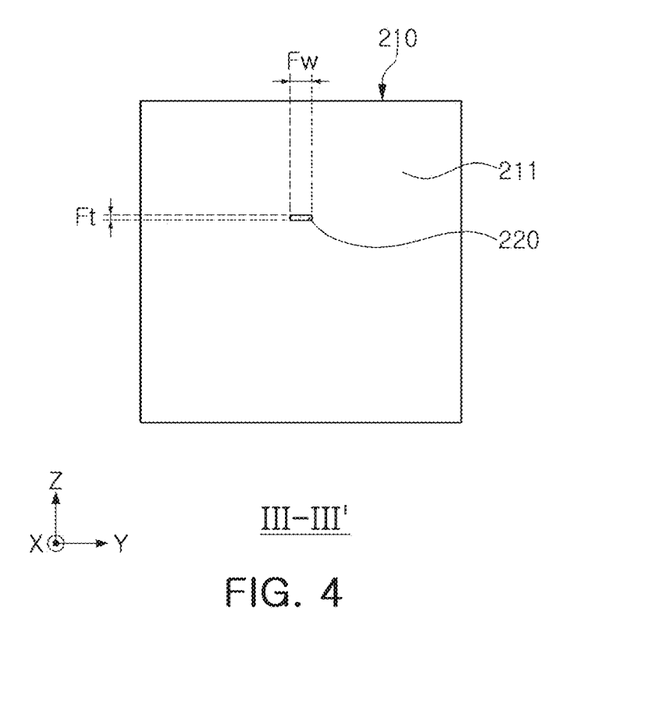
FIG. 4 is a cross-sectional view taken along line of FIG. 1.

FIG. 4 is a cross-sectional view taken along line of FIG. 1.

Figure 5:
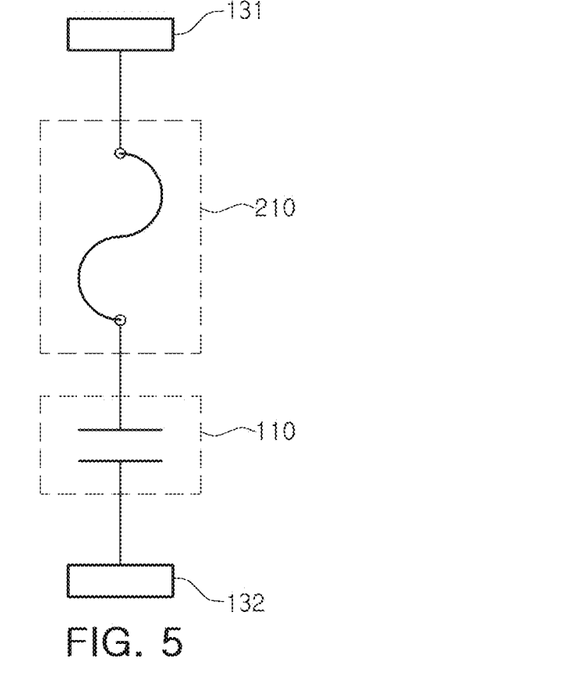
FIG. 5 is a circuit diagram illustrating an equivalent circuit of a composite electronic component according to an embodiment of the present disclosure.

FIG. 5 is a circuit diagram illustrating an equivalent circuit of a composite electronic component according to an embodiment of the present disclosure.

Hereinafter, a composite electronic component 1000 according to an embodiment of the present disclosure will be described in detail with reference to FIGS. 1 to 5.

The composite electronic component 1000 according to an embodiment of the present disclosure includes a capacitor structure 110 including a dielectric layer 111, and a first internal electrode 121 and a second internal electrode 122 alternately arranged in a first direction (e.g., a Z direction), with the dielectric layer 111 interposed therebetween; a fuse structure 210 including a fuse 220 and a fuse body 211; a common electrode 310 disposed between one surface of the capacitor structure in a second direction (e.g., an X direction), perpendicular to the first direction, and one surface of the fuse structure in the second direction, and connected to the first internal electrode 121 and the fuse 220; a first external electrode 131 disposed on the other surface of the fuse structure 210 in the second direction, and connected to the fuse 220; and a second external electrode 132 disposed on the other surface of the capacitor structure 110 in the second direction, and connected to the second internal electrode 122.

In the capacitor structure 110, the dielectric layer 111 and the internal electrode 121 or 122 may be alternately stacked.

Although the specific shape of the capacitor structure 110 is not particularly limited, as illustrated, the capacitor structure 110 may have a hexahedral shape or the like. Due to shrinkage of ceramic powder contained in the capacitor structure 110 during a firing process, the capacitor structure 110 may not have a perfectly hexahedral shape with completely straight lines, but may have a substantially hexahedral shape overall.

The capacitor structure 110 may have the first and second surfaces opposing each other in the thickness direction (the Z direction), the third and fourth surfaces connected to the first and second surfaces and opposing each other in the longitudinal direction (the X direction), and the fifth and sixth surfaces connected to the first and second surfaces, connected to the third and fourth surfaces, and opposing each other in the width direction (the Y direction).

A plurality of dielectric layers 111 forming the capacitor structure 110 may be in a fired state, and a boundary between adjacent dielectric layers 111 may be integrated to such an extent that it is difficult to identify the device without using a scanning electron microscope (SEM).

According to an embodiment of the present disclosure, a raw material for forming the dielectric layer 111 is not particularly limited, as long as sufficient capacitance may be obtained. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3$, $Ba(Ti_{1-y}Ca_y)O_3$, $(Ba_{1-x}Ca_x)(Ti_{1-z}Zr_z)O_3$, or $Ba(Ti_{1-y}Zr_y)O_3$, in which calcium (Ca), zirconium (Zr), or the like is partially dissolved into $BaTiO_3$, or the like.

As the material for forming the dielectric layer 111, various ceramic additives, organic solvents, plasticizers, binders, dispersants, or the like may be added to powders such as barium titanate ($BaTiO_3$) according to the purpose of the present disclosure. In this case, as the ceramic additives, various kinds such as transition metal oxides or carbides, rare earth elements, magnesium (Mg), aluminum (Al), or the like may be used.

The capacitor structure 110 may include a capacitance forming portion A disposed in the capacitor structure 110 and including the first internal electrode 121 and the second internal electrode 122 disposed to face each other with the dielectric layer 111 interposed therebetween, to form capacity; and an upper protective layer 112 and a lower protective layer 113 formed on the capacitance forming portion A, respectively, in upward and downward directions.

The capacitance forming portion A may be a portion for contributing to formation of capacity of the capacitor, and may be formed by repeatedly stacking the plurality of first and second internal electrodes 121 and 122 with the dielectric layer 111 interposed therebetween.

The upper protective layer 112 and the lower protective layer 113 may be formed by stacking a single dielectric layer or two or more dielectric layers on upper and lower surfaces of the capacitance forming portion, respectively, in a vertical direction, and may basically play a role in preventing damage to the internal electrodes due to physical or chemical stress.

The upper protective layer 112 and the lower protective layer 113 may not include an internal electrode, and may include the same material as the dielectric layer 111.

The internal electrodes 121 and 122 may be arranged to face each other with the dielectric layer 111 interposed therebetween. The internal electrodes 121 and 122 may include first and second internal electrodes 121 and 122 alternately arranged to face each other with the dielectric layer 111 interposed therebetween.

The first internal electrode 121 may be exposed from the one surface of the capacitor structure 110 in the second direction (the X direction), and the second internal electrode 122 may be exposed from the other surface of the capacitor structure 110 in the second direction (the X direction). The first internal electrode 121 may be exposed from the one surface of the capacitor structure 110 in the second direction (the X direction) to be connected to the common electrode 310. The common electrode 310 may be connected to the first external electrode 131 through the fuse 220. The second internal electrode 122 may be exposed from the other surface of the capacitor structure 110 in the second direction (the X direction) to be connected to the second external electrode 132. The first internal electrode 121 and the second internal electrode 122 may have different polarities.

The first internal electrode 121 may be disposed to be spaced apart from the other surface of the capacitor structure 110 in the second direction (the X direction), and the second internal electrode 122 may be disposed to be spaced apart from the one surface of the capacitor structure 110 in the second direction (the X direction). In addition, the first and second internal electrodes 121 and 122 may be electrically separated from each other by the dielectric layer 111 interposed therebetween.

The capacitor structure 110 may be formed by alternately stacking the dielectric layer 111 on which the first internal electrode layer 121 is printed, and the dielectric layer 111 on which the second internal electrode layer 122 is printed, in the thickness direction (the Z direction), and then firing the same.

A material for forming the internal electrodes 121 and 122 is not particularly limited, and a material having excellent electrical conductivity may be used. For example, the internal electrodes 121 and 122 may be formed by printing a conductive paste for the internal electrodes containing one or more of nickel (Ni), copper (Cu), palladium (Pd), silver (Ag), gold (Au), platinum (Pt), tin (Sn), tungsten (W), titanium (Ti), and alloys thereof, on a ceramic green sheet.

As a printing method of the conductive paste for the internal electrodes, a screen-printing method, a gravure printing method, or the like may be used, but the present disclosure is not limited thereto.

The fuse structure 210 may include the fuse 220 and the fuse body 211.

The fuse body 211 may prevent the first external electrode 131 and the common electrode 310 or the internal electrodes 121 and 122 from directly contacting each other, and may serve to connect the first external electrode 131 and the common electrode 310 through the fuse 220. For example, the first external electrode 131 and the common electrode 310 may be electrically connected to each other through the fuse 220, instead of being directly contacted and electrically connected to the first external electrode 131 and the common electrode 310. For this purpose, the fuse body 211 may have insulation properties.

A material for forming the fuse body 211 may only need to have insulation properties, but is not specifically limited. For example, the fuse body 211 may be formed using an insulating material such as a ceramic, glass, resin, rubber, or the like. In addition, the fuse body 211 may be formed using the same material as the dielectric layer 111 of the capacitor structure 110, and may be formed by stacking the plurality of ceramic green sheets.

Although the specific shape of the fuse body 211 is not particularly limited, as illustrated, the fuse body 211 may have a hexahedral shape or the like. The fuse body 211 may not have a perfectly hexahedral shape with completely straight lines, but may have a substantially hexahedral shape overall.

In addition, a thickness and a width of the fuse body 211 may have a value equal to or similar to a thickness and a width of the capacitor structure 110, respectively. A length of the fuse body 211 need not be particularly limited, and may be determined in consideration of a length (Fe) of the fuse 220.

The fuse 220 may serve to block a current from flowing, as the fuse 220 melts and is cut off by heat generated due to an overcurrent when the overcurrent is applied.

The first internal electrode 121 and the second internal electrode 122 may be shorted due to an internal defect, an external shock, an external surge, or the like of the MLCC. In the case of shorting the MLCC, a function of the MLCC may be damaged. In case of using a voltage of a power line, the voltage may become 0V due to short of (+) and (−) lines, which may cause a circuit including an MLCC to malfunction. In addition, since most of the MLCCs are configured in parallel in the circuit, when a failure occurs in any one of the MLCCs configured in parallel, the circuit may no longer be functional.

Referring to FIG. 5, which is a circuit diagram illustrating an equivalent circuit of a composite electronic component according to an embodiment of the present disclosure, a capacitor structure 110 and a fuse structure 210 may be connected in series. In addition, when the internal electrode 121 and 122 are shorted from each other due to an internal defect, an external shock, an external surge, or the like of the capacitor structure 110, an overcurrent may flow between the first external electrode 131 and the second external electrode 132. The fuse 220 may melt and may be cut off by heat generated due to the overcurrent, and flow of current between the first external electrode 131 and the second external electrode 132 may be blocked. Therefore, it is possible to prevent the entire circuit to which the composite electronic component 1000 is connected from being damaged.

The formation of the fuse 220 is not specifically limited, and may be determined in consideration of tolerance in current of a circuit in which the composite electronic component is used. For example, the fuse 220 may include one or more of silver (Ag), copper (Cu), tin (Sn), zinc (Zn), tungsten (W), and alloys thereof.

According to an embodiment of the present disclosure, the fuse 220 may have a metal wire shape. Referring to FIGS. 2 and 4, a length (Fe), a width (Fw), and a thickness (Ft) of the fuse 220 may be determined in consideration of tolerance in current of a circuit in which the composite electronic component is used. In addition, a cross-section of the metal wire may have various shapes such as a circle, an ellipse, a triangle, a quadrangle, or the like.

The fuse 220 may be disposed in the fuse body 211 and may be exposed from one surface and the other surface of the fuse body 211 in the second direction (the X direction). The fuse 220 may be exposed from the one surface of the fuse body 211 in the second direction (the X direction) to be connected to the common electrode 310, and may be exposed from the other surface of the fuse body 211 in the second direction (the X direction) to be connected to the first external electrode 131.

Figure 6:
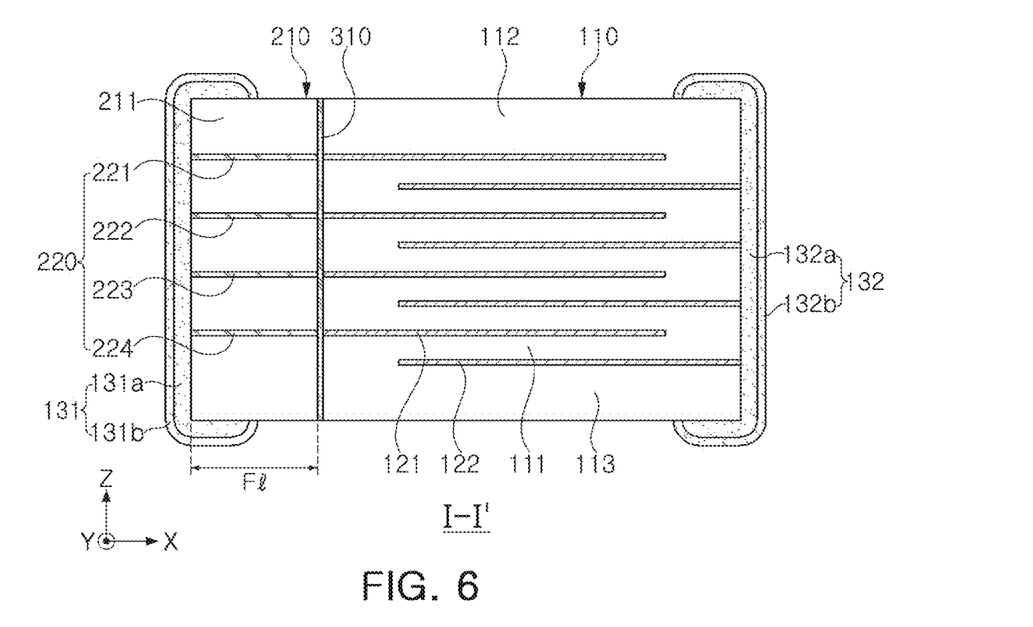
FIG. 6 is a cross-sectional view illustrating a modified example of a composite electronic component according to an embodiment of the present disclosure, taken along line I-I' of FIG. 1.
Figure 7:
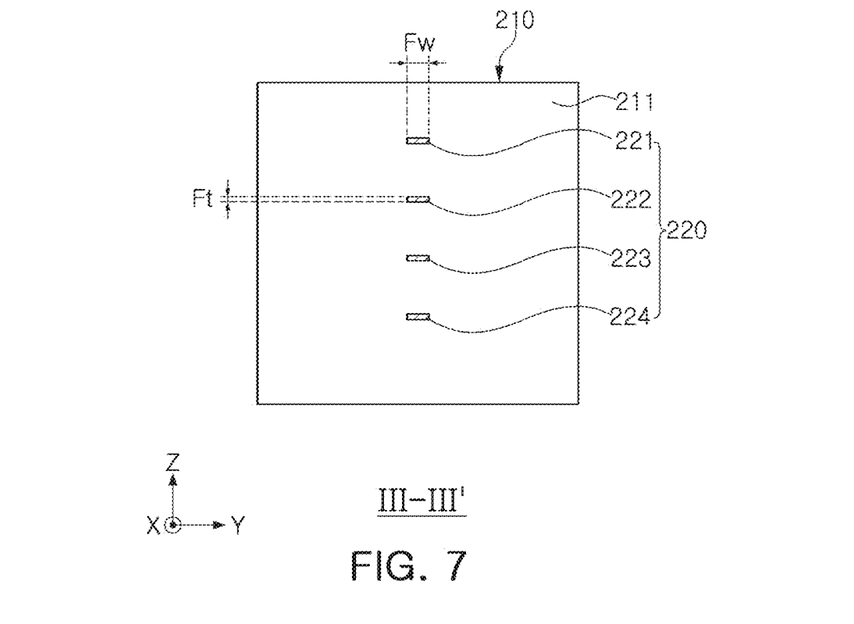
FIG. 7 is a cross-sectional view illustrating a modified example of a composite electronic component according to an embodiment of the present disclosure, taken along line of FIG. 1.

FIG. 6 is a cross-sectional view illustrating a modified example of a composite electronic component according to an embodiment of the present disclosure, taken along line I-I' of FIG. 1. FIG. 7 is a cross-sectional view illustrating a modified example of a composite electronic component according to an embodiment of the present disclosure, taken along line III-III' of FIG. 1.

Referring to FIGS. 6 and 7, a fuse 220 may be disposed as a plurality of fuses 221, 222, 223, and 224. Although a case in which the fuse 220 is configured as four fuses is illustrated, the present disclosure is not limited thereto, and the number of the fuses 220 may be determined in consideration of tolerance in current of a circuit in which the composite electronic component is used.

Figure 8:
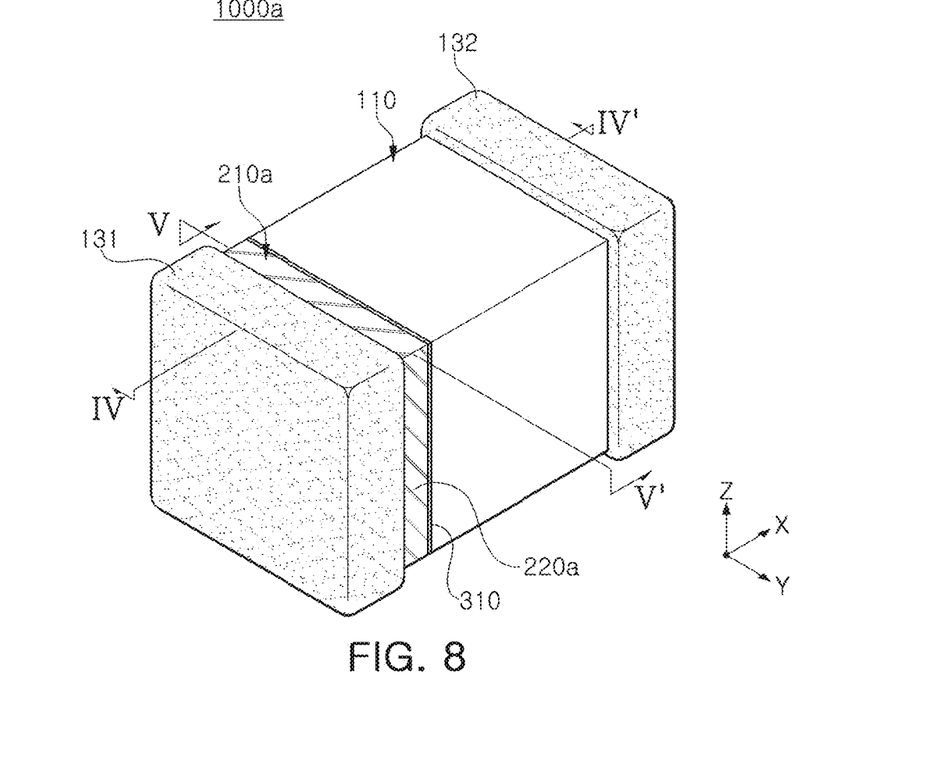
FIG. 8 is a perspective view schematically illustrating another modified example of a composite electronic component according to an embodiment of the present disclosure.
Figure 9:
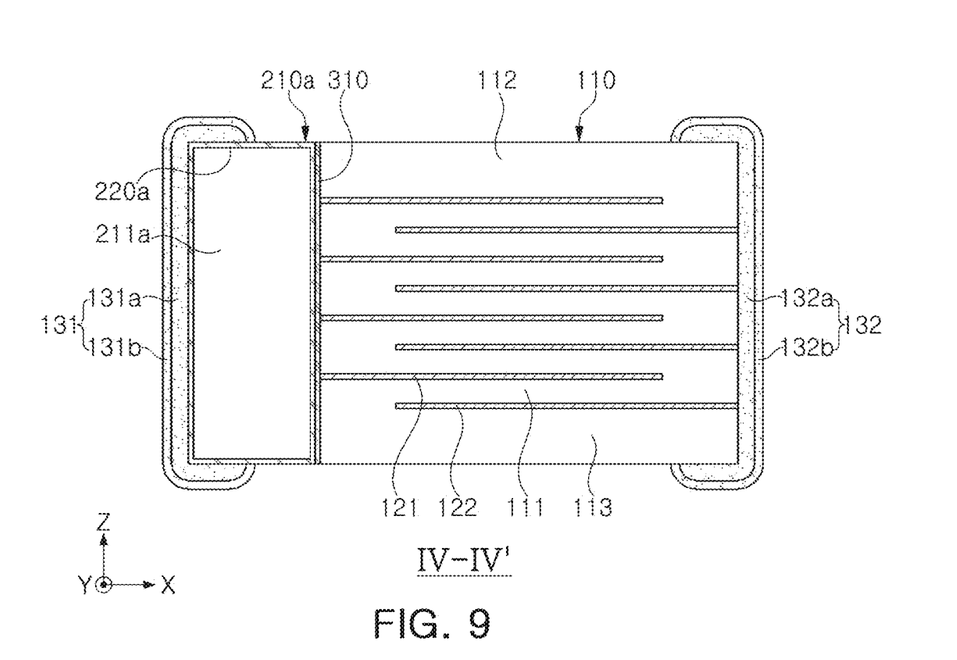
FIG. 9 is a cross-sectional view taken along line IV-IV' of FIG. 8.
Figure 10:
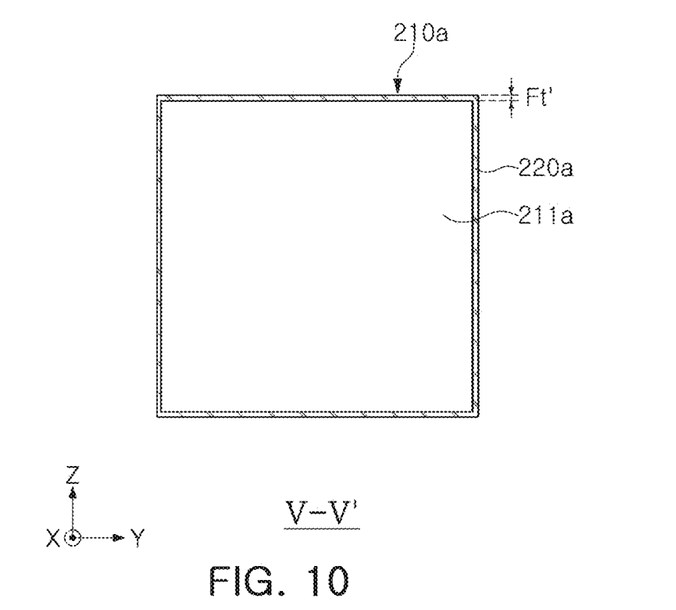
FIG. 10 is a cross-sectional view taken along line V-V' of FIG. 8.

FIG. 8 is a perspective view schematically illustrating another modified example of a composite electronic component 1000a according to an embodiment of the present disclosure. FIG. 9 is a cross-sectional view taken along line IV-IV' of FIG. 8. FIG. 10 is a cross-sectional view taken along line V-V' of FIG. 8.

In another modified example of the composite electronic component according to an embodiment of the present disclosure, a fuse 220a may be disposed to have a metal thin film covering an outer surface of a fuse body 211a. A thickness (Ft') of the metal thin film is not particularly limited, and the thickness (Ft') of the metal thin film may be determined in consideration of tolerance in current of a circuit in which the composite electronic component is used.

In this case, the fuse 220a may be a metal glaze. In this case, the metal glaze may refer to those prepared by mixing metal or metal oxide with glass, printing the mixture on the outer surface of the fuse body 211a, and firing the printed mixture at a high temperature. The metal or metal in the metal oxide may be one or more of nickel (Ni), copper (Cu), palladium (Pd), silver (Ag), gold (Au), platinum (Pt), tin (Sn), tungsten (W), titanium (Ti), and alloys thereof.

A common electrode 310 may be disposed between one surface of a capacitor structure 110 in the second direction and one surface of a fuse structure 210a in the second direction, and may serve to bond the capacitor structure 110 and the fuse structure 210a. In addition, the common electrode 310 may serve to connect a first internal electrode 121 of the capacitor structure 110 and the fuse 220 of the fuse structure 210a. Therefore, the capacitor structure 110 and the fuse structure 210a may be connected to each other in series.

The common electrode 310 may be formed using a material having electrical conductivity such as a metal, and a specific material may be determined in consideration of electrical characteristics, structural stability, and the like. For example, the common electrode 310 may be formed using one or more selected from the group consisting of nickel (Ni), copper (Cu), palladium (Pd), silver (Ag), gold (Au), platinum (Pt), tin (Sn), tungsten (W), titanium (Ti), and alloys thereof.

In this case, the common electrode 310 may include glass, resin, or the like to improve bonding force between the capacitor structure 110 and the fuse body 211. In particular, when the fuse body 211 is formed using a dielectric, the glass may be included in the common electrode to further improve the bonding force between the capacitor structure 110 and the fuse body 211. In addition, in a case in which the fuse body 211 is formed using a polymer, when the common electrode includes glass and resin, the bonding force between the capacitor structure 110 and the fuse body 211 may be further improved.

Therefore, the common electrode 310 may include a conductive metal, and may include one or more of glass and resin.

In addition, although the common electrode is illustrated as being exposed externally in an embodiment of the present disclosure, the present disclosure is not limited thereto. Further, the common electrode may be disposed not to be exposed externally in consideration of the use environment, or a portion exposed by the common electrode may be covered by a cover portion (not illustrated) to prevent the common electrode from being exposed externally.

A first external electrode 131 may be disposed on the other surface of the fuse structure 210 in the second direction, and may be connected to the fuse 220, and a second external electrode 132 may be disposed on the other surface of the capacitor structure in the second direction, and may be connected to a second internal electrode 122. In a similar manner to those illustrated in FIG. 2, the first external electrode 131 may be electrically connected to a first internal electrode 121 through the fuse 220 and the common electrode 310.

The external electrodes 131 and 132 may be formed using any material as long as they have electrical conductivity such as metal, a specific material may be determined in consideration of electrical characteristics, structural stability, and the like, and may have a multilayer structure.

For example, the external electrodes 131 and 132 may include electrode layers 131a and 132a, and plated layers 131b and 132b formed on the electrode layers 131a and 132a, respectively.

As a more specific example of the electrode layers 131a and 132a, the electrode layers 131a and 132a may be sintered electrodes including a conductive metal and a glass, or resin-based electrodes including a conductive metal and a resin.

In addition, the electrode layers 131a and 132a may have a form in which the sintered electrode and the resin-based electrode are sequentially formed on the capacitor structure 110 or the fuse structure 210. In addition, the electrode layers 131a and 132a may be formed by transferring a sheet including the conductive metal on the capacitor structure 110 or the fuse structure 210, or may be formed by transferring the sheet including the conductive metal on the sintered electrode. In addition, the first and second electrode layers 131a and 132a may be formed using an atomic layer deposition (ALD) process, a molecular layer deposition (MLD) process, a chemical vapor deposition (CVD) process, a sputtering process, or the like.

The conductive metal used for the electrode layers 131a and 132a is not particularly limited as long as it is a material that may be electrically connected to the internal electrode to form capacitance. For example, one or more selected from the group consisting of nickel (Ni), copper (Cu), palladium (Pd), silver (Ag), gold (Au), platinum (Pt), tin (Sn), tungsten (W), titanium (Ti), and alloys thereof may be included.

As a more specific example of the plated layers 131b and 132b, the plated layers 131b and 132b may be nickel (Ni) plated layers, or tin (Sn) plated layers, may have a form in which the nickel (Ni) plated layers and the tin (Sn) plated layers are sequentially formed on the electrode layers 131a and 132a, and may have a form in which the tin (Sn) plated layer, the nickel (Ni) plated layer, and the tin (Sn) plated layer are formed sequentially. In addition, the plated layers 131b and 132b may include a plurality of nickel (Ni) plated layers and/or a plurality of tin (Sn) plated layers.

Figure 11:
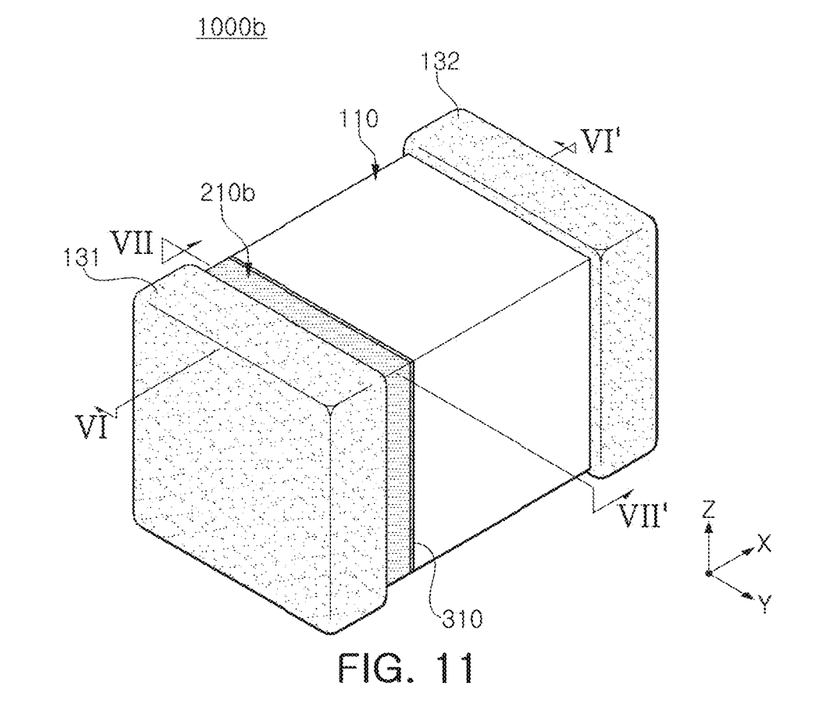
FIG. 11 is a perspective view schematically illustrating a composite electronic component according to another embodiment of the present disclosure.

FIG. 11 is a perspective view schematically illustrating a composite electronic component according to another embodiment of the present disclosure.

Figure 12:
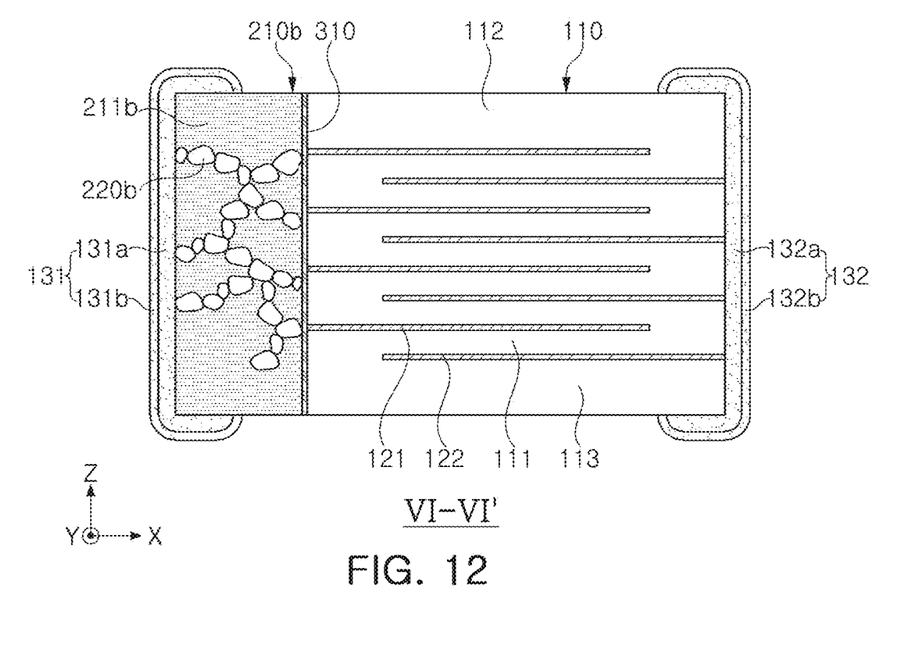
FIG. 12 is a cross-sectional view taken along line VI-VI' of FIG. 11.

FIG. 12 is a cross-sectional view taken along line VI-VI' of FIG. 11.

Figure 13:
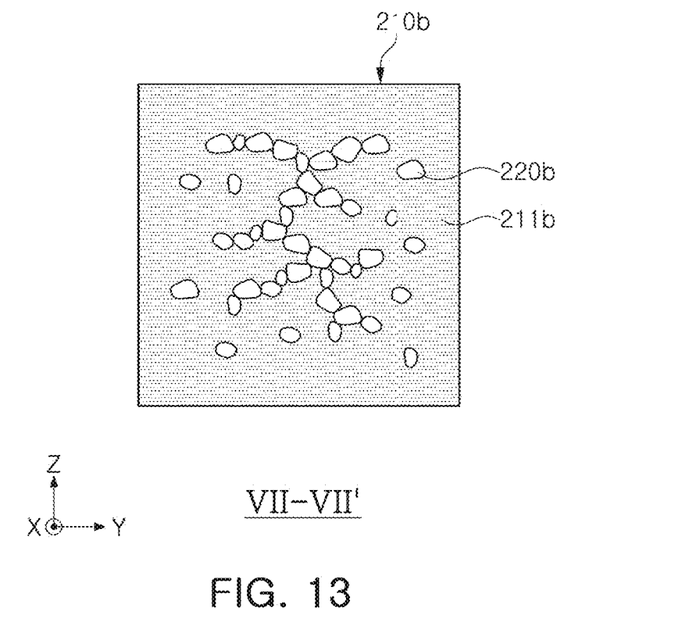
FIG. 13 is a cross-sectional view taken along line VII-VII' of FIG. 11.

FIG. 13 is a cross-sectional view taken along line VII-VII' of FIG. 11.

Figure 14:
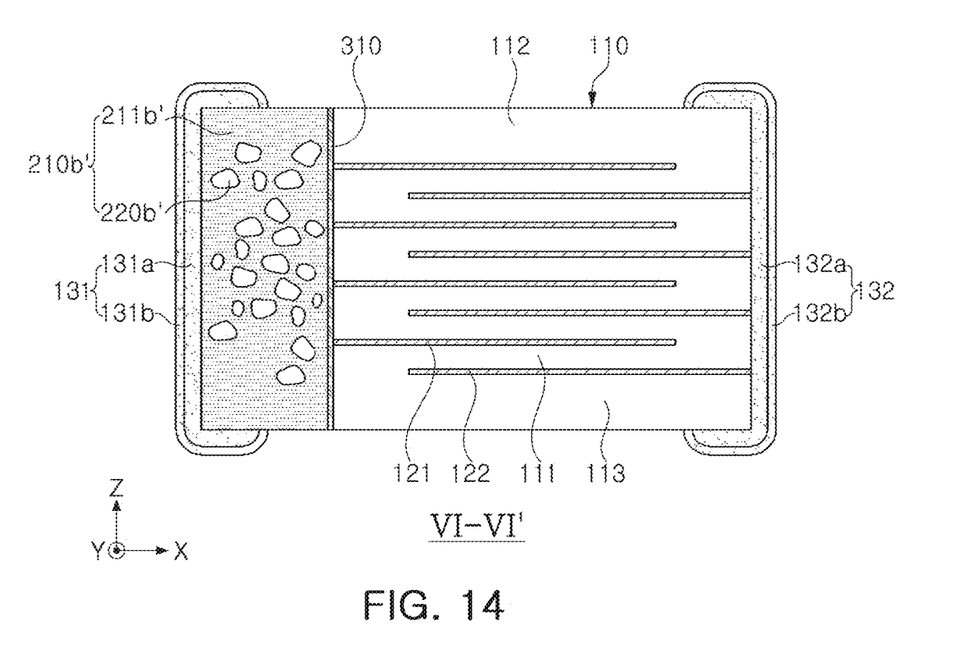
FIG. 14 is a cross-sectional view illustrating a state in which an overcurrent is applied and a fuse is opened, taken along line VI-VI' of FIG. 11.

FIG. 14 is a cross-sectional view illustrating a state in which an overcurrent is applied and a fuse is opened, taken along line VI-VI' of FIG. 11.

Hereinafter, a composite electronic component 1000b according to another embodiment of the present disclosure will be described in detail with reference to FIGS. 11 to 14. However, in order to avoid overlapping descriptions, descriptions common to the composite electronic component 1000 according to an embodiment of the present disclosure may be omitted.

The composite electronic component 1000b according to another embodiment includes a capacitor structure 110 including a dielectric layer 111, and a first internal electrode 121 and a second internal electrode 122 alternately arranged in the first direction (e.g., the Z direction), with the dielectric layer 111 interposed therebetween; a fuse structure 210b including a fuse 220b including a plurality of conductive particles and a polymer 211b; a common electrode 310 disposed between one surface of the capacitor structure in the second direction (e.g., the X direction), perpendicular to the first direction, and one surface of the fuse structure 210b in the second direction, and connected to the first internal electrode 121 and the fuse 220b; a first external electrode 131 disposed on the other surface of the fuse structure 210b in the second direction, and connected to the fuse 220b; and a second external electrode 132 disposed on the other surface of the capacitor structure 110 in the second direction, and connected to the second internal electrode 122.

The fuse structure 210b may include the fuse 220b and the polymer 211b, to serve as a resettable fuse. In general, a fuse cannot be reused, because electricity of the fuse cannot flow again when an overcurrent flows and the fuse is cut off to be an open state. Since the fuse structure 210b according to another embodiment of the present disclosure may serve as a resettable fuse, the fuse structure 210b may be opened when an overcurrent occurs and a short circuit may occur again when the overcurrent is released. Therefore, the fuse structure 210b according to another embodiment of the present disclosure may be reused, and an abnormal operation of the composite electronic component may be prevented to improve stability of the composite electronic component.

A resettable fuse is commonly known as a PPCT element.

The PPTC element may be formed of semi-crystalline polymers containing conductive fillers. The PPTC element may be thermally expanded in a melting region of the polymers when a temperature increases due to an overcurrent in abnormal conditions (generation of Joule heat) to increase a space between particles of the conductive fillers in the polymers, to change a crystal structure to an amorphous structure. The electrical resistance in the conductors may increase rapidly to disrupt flow of current and limit an overcurrent. When the overcurrent is released and the temperature falls, there may be characteristics of restoring to a normal state again.

Referring to FIG. 12, in a normal operation in which an overcurrent does not flow, a plurality of conductive particles may be disposed as a connector continuously connected to each other, such that the first external electrode 131 and the first internal electrode 121 may be electrically connected through the fuse 220b.

Referring to FIG. 14, when an overcurrent flows between a first external electrode 131 and a second external electrode 132 due to an abnormal situation, such as in a state in which a short occurs between internal electrodes 121 and 122, heat generated by the overcurrent may cause a polymer 211b' to thermally expand. Therefore, connection between a plurality of conductive particles may be cut off, and a fuse 220b' may be opened.

Subsequently, when a factor for the overcurrent is removed, a temperature of the polymer may be lowered again and the polymer may be contracted. In a similar manner to that illustrated in FIG. 12, the plurality of conductive particles may be again arranged as a connector continuously connected to each other, to electrically connect the first electrode 131 and the first internal electrode 121 through the fuse 220b.

The fuse 220b may be composed of a plurality of conductive particles.

At least a portion of the plurality of conductive particles may be disposed as a connector continuously connected to each other, and the connector may be exposed from one surface and the other surface of a fuse structure 210b, to electrically connect the first external electrode 131 and the common electrode 310 through the fuse 220b.

In this case, the conductive particles may be carbon particles.

The polymer 211b may be used as long as it is a polymer expandable by heat generated by an overcurrent, and may be determined in consideration of tolerance in current of a circuit in which the composite electronic component is used. For example, the polymer 211b may be one or more of polyethylene, polypropylene, and linear low-density polyethylene.

One of the effects of the present disclosure is that, since a composite electronic component includes a capacitor structure and a fuse structure, when a short circuit occurs between internal electrodes of the capacitor structure, a fuse of the fuse structure may be opened due to an overcurrent generated by the short circuit. Therefore, a circuit to which the composite electronic component is connected may be prevented from being damaged.

One of the effects of the present disclosure is that, in a composite electronic component including a capacitor structure and a fuse structure, since the fuse structure has a resettable fuse function which is opened when an overcurrent occurs and shorted again when the overcurrent is released, stability of the composite electronic component may be improved.

However, various advantages and effects of the present disclosure are not limited to the above description, and will be more readily understood in the process of describing specific embodiments of the present disclosure.

While embodiments have been illustrated and described above, it will be apparent to those skilled in the art that modified examples and variations could be made without departing from the scope of the present disclosure as defined by the appended claims.

What is claimed is:

1. A composite electronic component comprising:
a capacitor structure including a dielectric layer, and a first internal electrode and a second internal electrode alternately arranged in a first direction, with the dielectric layer interposed therebetween, thereby forming a capacitance forming portion;
a fuse structure including a fuse and a fuse body;
a common electrode disposed between one surface of the capacitor structure and one surface of the fuse structure in a second direction crossing the first direction, wherein the common electrode covers an entire portion of a surface of the capacitance forming portion extending in a third direction crossing the first and second directions, the common electrode connected to the first internal electrode and the fuse;
a first external electrode disposed on the other surface of the fuse structure in the second direction, and connected to the fuse; and
a second external electrode disposed on the other surface of the capacitor structure in the second direction, and connected to the second internal electrode.

2. The composite electronic component according to claim 1, wherein the first internal electrode is exposed from the one surface of the capacitor structure in the second direction, and the second internal electrode is exposed from the other surface of the capacitor structure in the second direction.

3. The composite electronic component according to claim 1, wherein the fuse is disposed in the fuse body and exposed from the one surface and the other surface of the fuse body in the second direction.

4. The composite electronic component according to claim 1, wherein the fuse has a metal wire shape.

5. The composite electronic component according to claim 4, wherein the fuse is disposed as a plurality of fuses.

6. The composite electronic component according to claim 1, wherein the fuse has a metal thin film shape covering an outer surface of the fuse body.

7. The composite electronic component according to claim 6, wherein the fuse is a metal glaze.

8. The composite electronic component according to claim 1, wherein the common electrode comprises a conductive metal, and one or more of glass and resin.

9. The composite electronic component according to claim 1, wherein the second direction is perpendicular to the first direction.

10. A composite electronic component comprising:
a capacitor structure including a dielectric layer, and a first internal electrode and a second internal electrode alternately arranged in a first direction, with the dielectric layer interposed therebetween;
a fuse structure including a polymer and a fuse including a plurality of conductive particles;
a common electrode disposed between one surface of the capacitor structure in a second direction, crossing the first direction, and one surface of the fuse structure in the second direction, the common electrode connected to the first internal electrode and the fuse;
a first external electrode disposed on the other surface of the fuse structure in the second direction, and connected to the fuse; and
a second external electrode disposed on the other surface of the capacitor structure in the second direction, and connected to the second internal electrode.

11. The composite electronic component according to claim 10, wherein the first internal electrode is exposed from the one surface of the capacitor structure in the second direction, and the second internal electrode is exposed from the other surface of the capacitor structure in the second direction.

12. The composite electronic component according to claim 10, wherein at least a portion of the plurality of conductive particles are arranged as a connector continuously connected to each other,
wherein the connector is exposed from the one surface and the other surface of the fuse structure in the second direction.

13. The composite electronic component according to claim 10, wherein the conductive particles include carbon particles.

14. The composite electronic component according to claim 10, wherein the common electrode comprises a conductive metal, and one or more of glass and resin.

15. The composite electronic component according to claim 10, wherein the second direction is perpendicular to the first direction.

16. A composite electronic component comprising:
a capacitor structure including dielectric layers, and first internal electrodes and second internal electrodes alternately arranged in a first direction with a respective one of the dielectric layers interposed therebetween, thereby forming a capacitance forming portion;
a common electrode directly connected to the first internal electrodes and covering an entire portion of a surface of the capacitance forming portion extending in a second direction crossing the first direction;
a fuse structure including a fuse and a fuse body;
a first external electrode disposed on the fuse structure; and
a second external electrode disposed on the capacitor structure and connected to the second internal electrodes,
wherein the fuse connects the common electrode and the first external electrode to each other.

17. The composite electronic component according to claim 16, wherein at least a portion of the fuse is disposed between the first external electrode and the capacitor structure.

18. The composite electronic component according to claim 16, wherein the fuse has a wire shape embedded in the fuse body.

19. The composite electronic component according to claim 16, wherein the fuse covers an outer surface of the fuse body.

20. The composite electronic component according to claim 16, wherein the fuse body includes a polymer and the fuse includes a plurality of conductive particles dispersed in the polymer.

* * * * *